(12) United States Patent
Freed et al.

(10) Patent No.: US 11,640,344 B2
(45) Date of Patent: May 2, 2023

(54) AUTOMATED TESTING FOR CONTENT RECEIVERS

(71) Applicant: DISH Technologies L.L.C., Englewood, CO (US)

(72) Inventors: James Freed, Denver, CO (US); Jeffrey Anderson, Thornton, CO (US)

(73) Assignee: DISH Technologies L.L.C., Englewood, CO (US)

(*) Notice: Subject to any disclaimer, the term of this patent is extended or adjusted under 35 U.S.C. 154(b) by 423 days.

(21) Appl. No.: 16/710,972

(22) Filed: Dec. 11, 2019

(65) Prior Publication Data
US 2020/0125466 A1   Apr. 23, 2020

Related U.S. Application Data

(62) Division of application No. 14/858,676, filed on Sep. 18, 2015, now Pat. No. 10,521,319.

(51) Int. Cl.
*H04N 21/226*   (2011.01)
*G06F 11/263*   (2006.01)
*G06F 11/22*   (2006.01)

(52) U.S. Cl.
CPC ........ *G06F 11/263* (2013.01); *G06F 11/2268* (2013.01); *G06F 11/2294* (2013.01)

(58) Field of Classification Search
CPC ............................. H04N 21/235; H04N 21/26
See application file for complete search history.

(56) References Cited

U.S. PATENT DOCUMENTS

| | | | |
|---|---|---|---|
| 7,546,584 B2 | 6/2009 | Rovang | |
| 8,458,757 B2 | 6/2013 | Pham | |
| 8,677,433 B2 | 3/2014 | Sankaranarayanan et al. | |
| 8,698,900 B1* | 4/2014 | Tang | H04N 21/42204 717/124 |
| 8,881,195 B2 | 11/2014 | Clements | |
| 10,320,504 B2* | 6/2019 | Pham | H04H 60/31 |
| 2004/0060069 A1 | 3/2004 | Abramson | |
| 2005/0028216 A1* | 2/2005 | Vogel | H04N 7/173 714/48 |
| 2009/0089854 A1* | 4/2009 | Le | H04N 21/6582 725/139 |
| 2009/0282455 A1 | 11/2009 | Bell et al. | |
| 2009/0292375 A1* | 11/2009 | Thompson | G08C 19/28 700/86 |
| 2010/0271488 A1* | 10/2010 | Garcia | H04N 19/46 348/180 |

(Continued)

*Primary Examiner* — Mushfikh I Alam
(74) *Attorney, Agent, or Firm* — Seed IP Law Group LLP

(57) ABSTRACT

An automated test platform is disclosed for use in developing and troubleshooting customized software for multimedia content receivers. The automated test platform allows developers to script test cases that permit interaction with multiple content receivers at the same time. The test platform can be applied generally to any client-server system. The automated test platform is used to create scripts, run the scripts on multiple content receivers, and view test results. A graphical user interface (GUI) is provided that allows technicians without any programming experience to build and run complex interactive test sequences in a modular fashion. Such an automated test platform can be used to test cable and satellite television set top boxes, as well as DVD players, streaming media receivers, and game consoles.

20 Claims, 4 Drawing Sheets

(56) References Cited

U.S. PATENT DOCUMENTS

| | | | |
|---|---|---|---|
| 2011/0088070 A1 | 4/2011 | Pham et al. | |
| 2011/0107389 A1 | 5/2011 | Chakarapani | |
| 2011/0307913 A1 | 12/2011 | Wang et al. | |
| 2012/0050546 A1* | 3/2012 | Pham | H04N 17/004 348/192 |
| 2012/0144409 A1 | 6/2012 | Pham | |
| 2012/0162440 A1 | 6/2012 | Wu et al. | |
| 2012/0246667 A1 | 9/2012 | Rothschild | |
| 2012/0278826 A1 | 11/2012 | Jones et al. | |
| 2013/0057704 A1* | 3/2013 | Savoor | G06F 11/2294 348/180 |
| 2013/0129303 A1* | 5/2013 | Lee | G11B 27/10 386/E5.031 |
| 2014/0130111 A1* | 5/2014 | Nulty | H04L 41/0631 725/107 |
| 2014/0368665 A1* | 12/2014 | Lirette | H04N 17/04 348/180 |
| 2015/0007217 A1* | 1/2015 | Wood | H04N 21/44008 725/32 |
| 2015/0033273 A1* | 1/2015 | Pham | H04H 60/29 725/107 |
| 2015/0095940 A1* | 4/2015 | Redmann | H04N 21/41415 725/32 |
| 2016/0012352 A1* | 1/2016 | Peng | G06N 5/025 706/12 |
| 2016/0105715 A1* | 4/2016 | Panje | H04N 21/4424 725/14 |
| 2016/0125958 A1* | 5/2016 | Caulfield | G11C 29/021 714/721 |
| 2017/0078159 A1 | 3/2017 | Bae et al. | |
| 2020/0380855 A1* | 12/2020 | Arling | G08C 17/02 |

* cited by examiner

AUTOMATED TESTING FOR CONTENT RECEIVERS

BACKGROUND

Technical Field

The present disclosure generally relates to testing multi-media receiver systems and, in particular, to generating and running test scripts for such systems.

Description of the Related Art

Providers of television entertainment content typically install a content receiver at a customer's location, such as a home or business. The content receiver, sometimes called a set top box, receives multi-media signals via coaxial cable, a satellite antenna, a telephone line, or the Internet, for example. The content receiver includes electronic hardware that processes the multimedia signals for viewing on a display such as a television screen, projection device, or monitor. The content receiver also includes proprietary software that controls the hardware and provides an interactive format that a viewer can use, via a remote control, to select programming to watch in real time, or to store for viewing at a later time. Hardware and software inside the content receiver is frequently updated with new versions and new capabilities. For example, some content receivers are more complex than others in that they are equipped to manage the output of multimedia content to be displayed on multiple display devices in multiple locations. There may also be many different content receiver choices based on different service packages available to the consumer. Remote control hardware and software is also frequently updated, and must be compatible with the content receivers. Engineers and manufacturers who produce content receivers therefore need to perform functional testing, evaluation, and troubleshooting of content receivers on a frequent basis, and on a large volume of devices being provided to customers. Performing such tests in a serial fashion, one content receiver at a time, is a time-consuming, labor-intensive, and therefore costly process.

BRIEF SUMMARY

An automated test platform is disclosed for use by content providers, such as cable and satellite TV companies, for developing and troubleshooting customized software for multimedia content receivers. The automated test platform may be used internally, by a development organization, for example, to perform quality assurance (QA) tests following release of a new version of software. In the testing environment, multiple content receivers, for example, may be arranged in a client-server relationship. The automated test platform allows developers to script test cases that permit interaction with multiple content receivers at the same time. Through the creation of user-configured test scripts, the automated test platform is thus customized to the particular content provider. The automated test platform is used to create scripts, run the scripts on multiple content receivers, and view test results to assess functionality of the content receiver software and/or hardware. A graphical user interface (GUI) is provided that allows technicians without any programming experience to build and run complex interactive test sequences in a modular fashion. Such an automated test platform can be used to test cable and satellite television set top boxes, as well as DVD players, streaming media receivers, and game consoles.

BRIEF DESCRIPTION OF THE SEVERAL VIEWS OF THE DRAWINGS

In the drawings, identical reference numbers identify similar elements. The sizes and relative positions of elements in the drawings are not necessarily drawn to scale.

DETAILED DESCRIPTION

Figure 1:
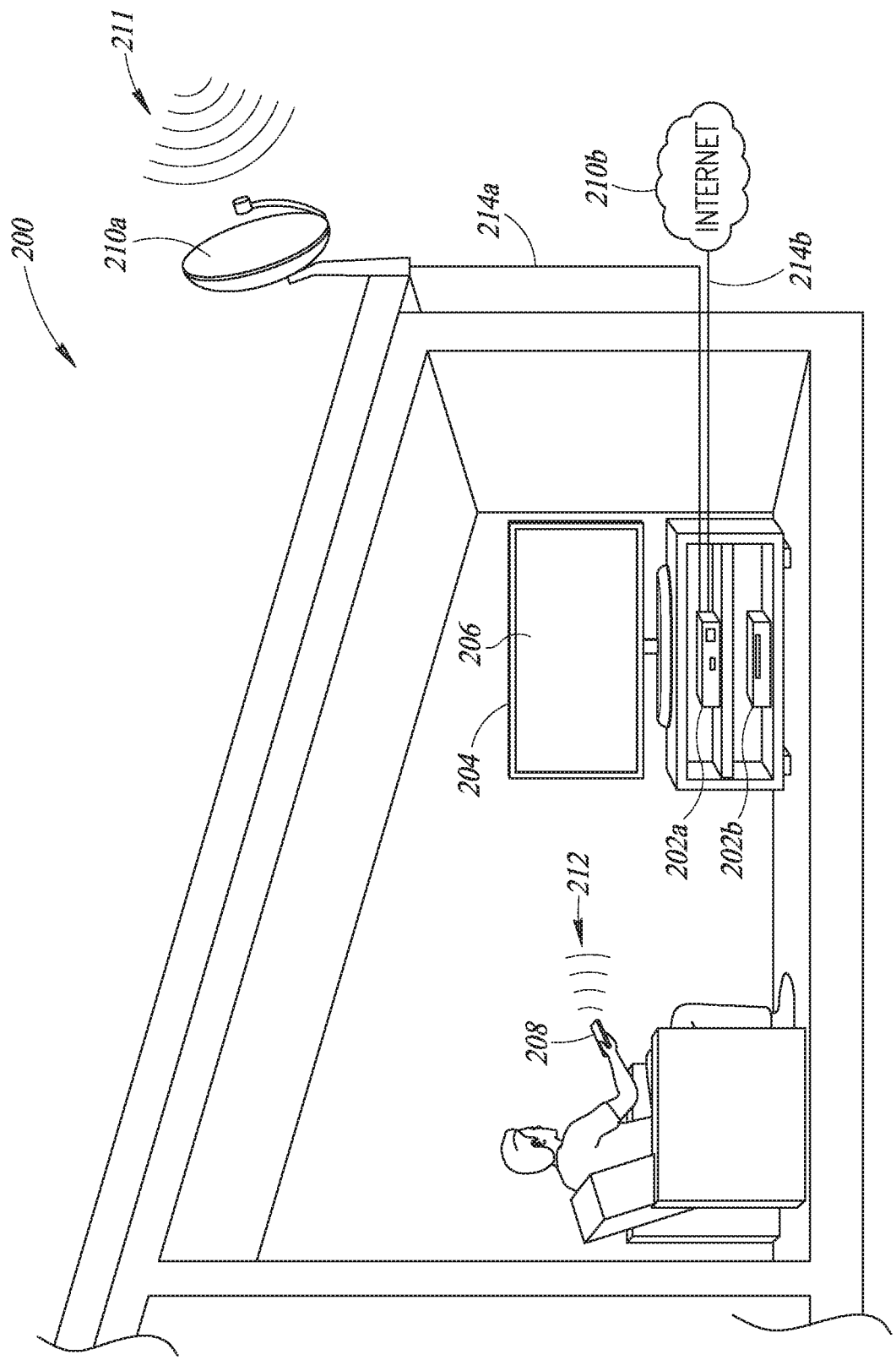
FIG. 1 is a schematic illustration of an exemplary residential media entertainment system, according to one embodiment described herein.

In this specification, embodiments of the present disclosure illustrate a subscriber satellite television service as an example. This detailed description is not meant to limit the disclosure to any specific embodiment. The present disclosure is equally applicable to cable television systems, broadcast television systems, Internet streaming media systems, or other television or video distribution systems that include user hardware, typically in the form of a content receiver or set top box that is supported by the media provider or by a third party maintenance service provider. Such hardware can also include, for example, digital video recorder (DVR) devices and/or digital-video-disc (DVD) recording devices or other accessory devices inside, or separate from, the content receiver.

Throughout the specification, the terms "subscriber" and "customer" refer to an end user who has a service contract with a media service provider and who has an account associated with the media service provider. Subscriber equipment typically resides at the subscriber's address. The terms "user" and "viewer" refer to anyone using part or all of the home entertainment system components described herein.

One skilled in the art will recognize that the term "signal" refers to any digital or analog signal. Such signals can include, but are not limited to, a bit, a specified set of bits, an A/C signal, or a D/C signal. Uses of the term "signal" in the description can include any of these different interpretations. It will also be understood to one skilled in the art that the terms "connected" and "coupled" are not limited to a physical connection but can refer to any means of communicatively or operatively coupling two devices, for example, a wireless connection.

As a general matter, the terms "content receiver," "television converter," "receiver," "set top box," "television receiving device," "television receiver," "television recording device," "satellite set top box," "satellite receiver," "cable set top box," and "cable receiver" are used interchangeably to refer to a converter device or electronic equipment that has the capacity to acquire, process and distribute one or more television signals transmitted by broadcast, cable, telephone or satellite distributors, or Internet service providers who are a source of streaming media. The terms "digital video recorder (DVR)" and "personal video recorder (PVR)" refer interchangeably to devices that can record and play back television signals and that can implement playback functions including, but not limited to, play, fast-forward, rewind, and pause. As set forth in this specification and the figures pertaining thereto, DVR and PVR functionality or devices can be combined with a content receiver. The signals transmitted by these broadcast, cable, telephone, satellite, or other distributors can include, individually or in any combination, Internet, radio, television or telephonic data, and streaming media. One skilled in the art will recognize that a content receiver can be implemented, for example, as an external self-enclosed unit, a plurality of external self-enclosed units, or as an internal unit housed within a television, a computer, or a mobile computing device. One skilled in the art will further recognize that the present disclosure can apply to analog or digital satellite content receivers.

As yet another general matter, it will be understood by one skilled in the art that the term "television" refers to a television set or video display that can contain an integrated television converter device, for example, an internal cable-ready television tuner housed inside a television or, alternatively, that is connected to an external television converter device such as an external set top box connected via cabling to a television. A further example of an external television converter device is the EchoStar Hopper combination satellite set top box and DVR.

Turning now to the drawings, FIG. 1 illustrates one embodiment of a home entertainment setup, which includes a satellite-based multimedia receiver system 200. The satellite-based multimedia receiver system 200 includes one or more content receivers 202 (two shown, 202a, 202b), a media presentation device 204 having a display 206, and a remote control 208. The satellite-based multimedia receiver system 200 can be located, for example, at a residence, office, or similar location for presenting entertainment media to various users.

The content receivers 202, e.g., a television set top box (STB), can be coupled to the media presentation device 204, e.g., TV, or the content receivers 202 can be in the form of hardware built into the media presentation device 204. Each content receiver 202 is communicatively coupled to one or more sources of broadcast media content 210 to receive media content for presentation via the media presentation device 204. The content receiver can be a satellite STB, a cable STB, a streaming media player, a digital video disk (DVD) player, a digital video recorder (DVR), a game console, or a machine that emulates any one of such devices. Instructions that carry out features of the satellite-based multimedia receiver system 200 are stored in, and/or executed by, components of the content receiver 202.

Sources of broadcast media content 210 can include one or more of a terrestrial television or radio antenna, a satellite television or radio antenna 210a, a broadband cable subscriber service, streaming media received from the Internet 210b directly or via a wireless Internet router, and the like. Media content is provided as a media signal, via communication links 214, e.g., a satellite antenna communication link 214a, or an Internet communication link 214b. The communication links 214 can accommodate a wired signal or a wireless signal. Furthermore, a content provider may provide to the viewer multiple media signals, e.g., via satellite and/or via the Internet as shown, via broadband cable and/or Internet, or in any other suitable way.

The satellite receiving antenna 210a receives media content via a satellite signal 211 from one or more satellite transponders in earth orbit. Each satellite transponder is, for purposes of the satellite-based multimedia receiver system, a source of content that transmits one or more media channels, such as HBO, ESPN, pay-per-view channels, etc., to the satellite receiving antenna 210a. A satellite television distributor can transmit one or more satellite television signals to one or more satellites. Satellite television distributors can utilize several satellites to relay the satellite television signals to subscribers. Each satellite can have several transponders. Transponders transmit the satellite signal from the satellite to the satellite receiving antenna 210a.

The broadcast media presentation device 204 having the display 206 can be any electronic device that presents media content to a user; for example, a television, a radio, a computer, a mobile computing device such as a laptop, a tablet, a gaming console, a smart phone, or the like, or the display 206 itself. The display 206 can be any kind of video display device such as a cathode ray tube display, a liquid crystal display (LCD), a plasma display, a television, a computer monitor, a rear projection screen, a front projection screen, a heads-up display, or any other electronic display device. The display 206 can be separate from, or integrated into, the media presentation device 204. The display 206 can include audio speakers, or the display 206 can be coupled to separate audio speakers. The term "for display" as used herein generally includes presentation of an audio component as well as a video component of the media signal.

The remote control 208 is configured to communicate with the content receiver 202 via a wireless connection 212; for example, an infrared (IR) signal. The remote control 208 can be operated by a user to cause the content receiver 202 to display received content on the media presentation device 204. The remote control 208 may also be used to display a programming guide on the display 206 and to communicate program selections to the content receiver 202. The remote control 208 can also be used to send commands to the content receiver 202, including channel selections, display settings, and the like. The signal 212 can use, for example, infrared or UHF transmitters within the remote control 208. One example of an embodiment of the remote control 208 is the EchoStar Technologies Corporation 40.0 Remote Control that includes an IR transmitter and an ultra-high frequency (UHF) transmitter. The remote control 208 may be able to send signals to other peripheral devices that form part of the satellite-based multimedia receiver system 200. The content receiver 202 may also be able to send signals to the remote control 208, including, but not limited to, signals to configure the remote control 208 to operate other peripheral devices in the satellite-based multimedia receiver system 200. In some embodiments, the remote control 208 has a set of Light Emitting Diodes (LEDs). Some remote controls can include Liquid Crystal Displays (LCDs) or other display screens. The remote control 208 can include buttons, dials, or other man-machine interfaces. While the remote control 208 can often be the common means for a user to communicate with the content receiver 202, one skilled in the art will recognize that other means of communicating with the content receiver 202 are available, including, but not limited to attached keyboards, smart phones, front panel buttons or touch screens.

Figure 2:
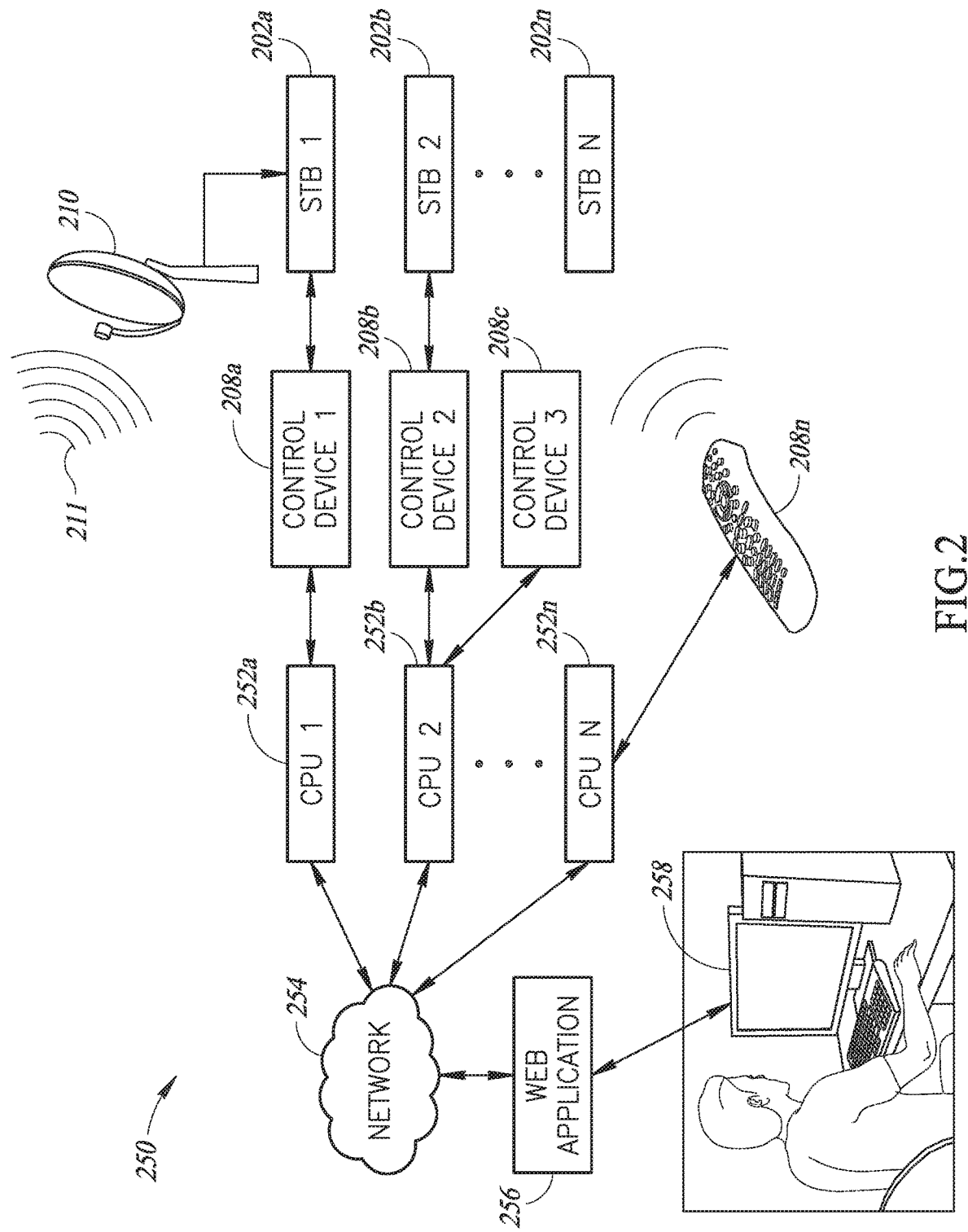
FIG. 2 is a block diagram showing components of an automated testing system for testing a plurality of content receivers, according to one embodiment described herein.

FIG. 2 shows a representative testing system 250, according to one embodiment. The testing system 250 includes hardware such as a number n of multiple content receivers shown as set top boxes (STBs), 202a-202n, collectively 202;

control devices 208a-208n, collectively 208; processor-based testing modules 252a-252n, collectively 252; a network 254; a customized application program 256 that executes on a user station 258; and a satellite receiving antenna 210 that receives a satellite signal 211 from a content distributor. A satellite TV set top box under test can be coupled to one or more live satellite inputs having different satellite orientations. Embodiments of the testing system 250 may include additional, or fewer, nodes or components than illustrated in FIG. 2.

The testing system 250 permits a content provider to initiate and control performance of a sequence of functionality tests on the content receivers 202. Functional testing of the content receivers 202 may address either hardware, software, or both. Functional testing of content receivers may be carried out on new content receiver software emulating an actual content receiver. Alternatively, functional testing of content receivers may be carried out on actual new content receivers manufactured and/or distributed by the content provider, prior to sale. Alternatively, functional testing of content receivers may be carried out on used content receivers that are identified as malfunctioning, for example, units that are returned by customers, or units that have been returned by previous customers and are being prepared for re-issue to new customers. Alternatively, functional testing of content receivers may be carried out remotely on content receivers that are currently in use and identified by customers as malfunctioning. Remote testing can be accomplished via a communications network, for example. Accordingly, the testing system 250 allows for testing of content receiver features before and after installation at a customer location.

The content receivers 202 can be accessed or controlled using the control devices 208, which may be embodied as remote control devices, smart phones, mobile computing devices, personal computers (PCs), or custom peripheral control devices, for example. Each control device 208 is coupled to a respective content receiver 202 and is programmed to deliver commands to that content receiver 202. The processor-based testing modules 252 are basic processor-based nodes coupled to the network 254, such as, for example, Windows™-based PCs, a Linux™-based Raspberry Pi™ credit-card sized single board computer, or any other basic computing device. The processor-based testing modules 252 need not be equipped with a keyboard, monitor, or other peripheral devices. The processor-based testing modules 252 are therefore also referred to as CPUs.

The network 254 can be a packet-switched communications network such as the Internet, an intranet, a wide-area network (WAN), a local-area network (LAN), or other type of data network.

The user station 258 can be any type of workstation configured to execute a customized application that tests functionality of the content receivers 202. The user station 258 may include a display and an input/output device, e.g., a keyboard, mouse, joystick, touch screen, or the like, via which the testing modules 252 receive input and interactive instructions from a user. Alternatively, the user station 258 may be a mobile device such as a tablet computer, or the like. The customized application program 256 implements a method of testing the content receivers 202 that prompts the user to assemble test scripts, initiate running the test scripts, and evaluate test results presented via the display. Assembly of test scripts employs a GUI-based scripting application. The customized application program 256 can be a web-based application, for example, that accesses the processor-based testing modules 252 via the World Wide Web portion of the Internet. Coupling via such a network 254 allows the user station 258 to be located remotely from the system under test.

Figure 3:
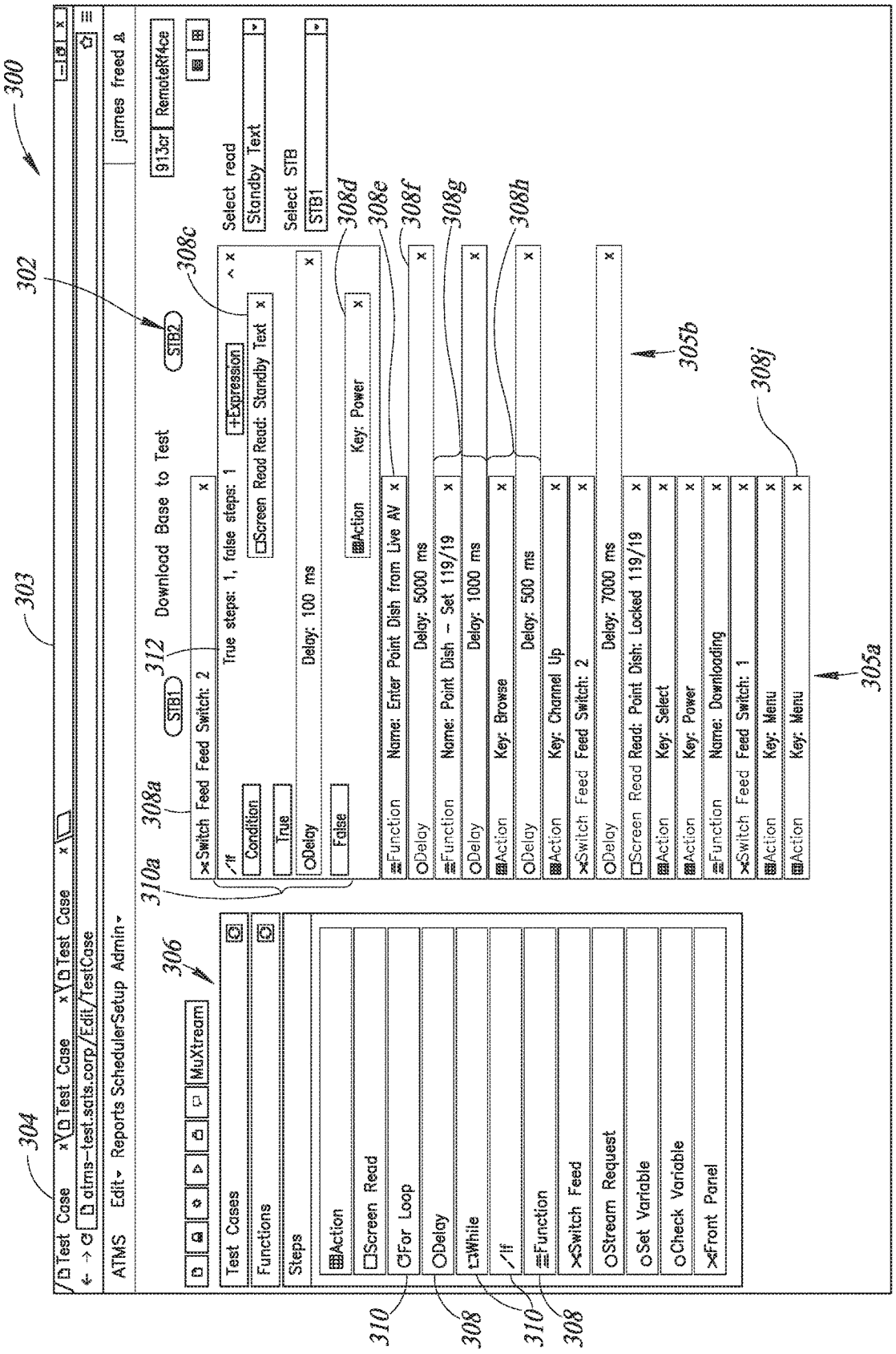
FIG. 3 is a screen shot of a user interface associated with the automated testing system of FIG. 2.

FIG. 3 shows an exemplary screen shot 300 associated with an automated test platform, according to one embodiment. The screen shot 300 shows what a user sees while working at the user station 258 to create a test matrix 302, run test scripts, and view results. In particular, the exemplary screen shot 300 shows a screen associated with the user station 258 during operation of the GUI-based scripting application.

The test matrix 302 is a data structure that stores test command sequences. The test matrix 302 can be made accessible for editing via, for example, a tab 304 located on a window 303. The test matrix 302, once it is interactively created, then serves as a program to be carried out by one or more of the processor-based testing modules 252, e.g., CPUs, via the control devices 208 to perform tests on one or more of the content receivers 202. The test matrix 302 consists of lists arranged in columns. Each column of the test matrix 302 contains a sequence of steps, or test script, 305 (two shown, 305a, 305b), for a particular content receiver 202 under test. Each test script 305 includes a sequence of commands that the processor-based testing module 252 will deliver to a corresponding content receiver 202 via the control device 208. The test script commands, shown herein by way of example, simulate interaction with the content receiver 202 via a remote control, in the same way that a TV viewer would interact with the content receiver. A first exemplary test script 305a shown in the center of the screen shot 300 is associated with STB1, designated as a server. A second test script, 305b, is associated with STB2, designated as a client. The test script 305a is executed starting at the top row of the test matrix 302, and ending at the bottom row. After the test matrix 302 is created, it can be saved in the memory 308 so that the test can be retrieved for execution at a later time.

On the left side of the screen shot 300 is a GUI-based scripting language menu 306 from which a user, e.g., a technician, can select test building blocks 308 from which to construct the test scripts 305a,b. For example, the technician can employ a mouse, touch pad, stylus, or the like to select, drag, and drop test building blocks 308 from the scripting language menu 306 to the test matrix 302. Each selection of a test building block 308 then becomes a row in the test matrix 302. Examples of test building blocks 308 that can be added to the test matrix 302 include commands, input blocks, output blocks, functions, and so on. Commands are carried out as specific interactions with an STB. In addition, the scripting language menu 306 includes conditional blocks 310 that can be added to perform logical functions as part of the test scripts. Such conditional blocks 310 include, for example, "While," and "If" blocks, e.g., 308b, as well as loops, e.g., the "For loop" shown in the scripting language menu 306, all of which are typical constructs used in computer programming. After a test building block 308 is added from the scripting language menu 306 to the test matrix 302, the technician may be prompted to enter additional information about how the command described in the test building block 308 is to be carried out, as explained in more detail below.

With reference to the example test matrix 302 shown in FIG. 3, the technician has created a test sequence 305a to test a content receiver STB1. The test sequence 305a begins with the command "Switch Feed" 308a. The "Switch Feed" command 308a refers to which satellite antenna 210 will be coupled to STB1 to feed content to STB1 during the test.

After dragging and dropping the command "Switch Feed" 308a onto the test script 305a STB1, the testing system prompted the technician to enter a desired switch position for the source antenna, by a prompt, "Feed switch: _". The technician has entered a "1" in 308a to indicate switching the feed switch to position 1 to engage a first satellite antenna, for example, satellite antenna 210a. There may be available one satellite antenna or multiple satellite antennas. Different satellite antennas 210 may be configured differently, so that an STB can be tested while receiving signals from various types of satellite antennas. The Feed switch command can then be used to select which antenna configuration to connect to for the present test, or to switch between the different satellite antennas 210.

Next, the technician has added a conditional if-then block 310a which will execute a delay step 308b if a condition 308c is true, or an action command 308d if the condition 308c is false. The condition 308c depends on the result of a "Screen Read" action on STB2. The Screen Read action sends a direct remote control command to STB2 to capture a screen shot of the TV screen for analysis. In particular, the exemplary Screen Read action 308c is "Read standby text," meaning that the screen is checked to determine whether the TV has responded to the remote control command. STB2 then stands by to wait for a response to appear on the screen. In this way, actual STB behavior can be compared to the behavior that the programmers expect. It is noted that there exists a library of Screen Read commands, each command reading a specific user interface (UI) element of the screen such as, for example, picture, text, and the like.

If the condition 308c is True, the delay step 308b will cause a delay of 100 milliseconds (ms) to occur. It is noted that the delay step 308b extends across both columns 305a and 305b, meaning that the delay step 308b is executed with respect to both content receivers STB1 and STB2 simultaneously. If the condition 308c is False, the action command 308d will be executed on STB2. The action has been entered by the technician as setting a key called "Power," meaning that STB2 will be powered on to wake up from a standby mode.

Next in the sequence is another Function command, 308e. The name of the function command 308e is "Enter Point dish from Live AV" which orients the satellite antenna 210a, connected to STB1, in a particular direction, followed by a 1000 ms delay, 308f. The time needed for the satellite antenna 210a to change positions can automatically cause a delay to be inserted after every "point dish" function so that the Function step and the Delay step in the sequence may be linked as a unit. Adding the delay inserts a pause in the execution of the test script 305a that allows time for STB1 to perform the requested function. The delays help to prevent a system crash from occurring in response to a sequence of rapid commands being received.

The next action unit 308h executes a "Browse" function followed by a 500 ms delay, and so on. It is noted that the action "Key: Menu" 308j is a shortcut that simulates selecting a main menu screen using a remote control.

One of the functions 308 available in the scripting language menu 306, but not used in the exemplary test scripts 305a, 305b, is a "Front Panel" command that simulates interaction with a set top box via buttons on the front panel.

Once a series of modular test script elements is created, a similar GUI can be used to build a more complex test sequence by combining the test script elements in different ways. Each test script element can be represented graphically by an icon, and different tests can then be sequenced by arranging the icons in a desired sequence.

Figure 4:
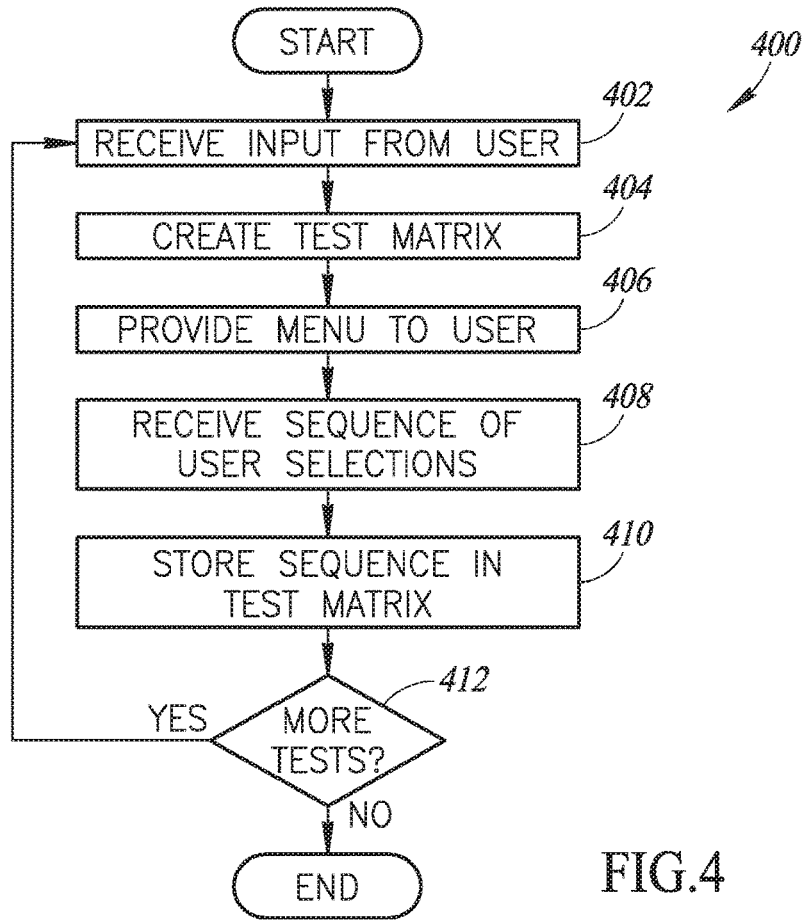
FIG. 4 is a process flow diagram showing a sequence of steps in a computer-implemented interactive scripting method, according to one embodiment described herein.

FIG. 4 shows a flow chart for a general computer-implemented interactive scripting method 400, according to one embodiment. The computer-implemented interactive scripting method 400 assists a user in creating test scripts to use in automated testing of a plurality of content receivers at the same time. The computer-implemented interactive scripting method 400 provides a user interface in which a user can easily generate the test matrix 302 in a modular fashion without programming skills. The computer-implemented method 400 is codified in the customized application program 256, and is executed by the testing system 250.

At 402, the customized application program 256 receives input from a technician at the user station 258 specifying a number of content receivers 202 to be tested.

At 404, the customized application program 256 generates a test matrix having a matrix dimension based on the number of content receivers specified by the technician. The test matrix 302 has a number of columns equal to the number of content receivers 202 to be tested.

At 406, the scripting language menu 306 is provided to the technician for selection of test building blocks 308 to become rows in the test matrix 302.

At 408 the customized application program 256 receives a sequence of user selections from the scripting language menu 306 for each one of the content receivers 202. The user selections constitute a sequence of actions to be executed as the test scripts 305. Each selection occupies a row in the test matrix 302.

At 410, the test scripts 305 are stored together as a test matrix 305 in a memory. The memory can be located in the user station 258, or in another memory location such as, for example, cloud storage accessible by the network 254.

At 412, if additional tests are desired the method 400 is repeated to create new or additional test scripts, which are then also stored for future use, as set forth below and shown in FIG. 5. The tests that were created in the sequence shown and described in FIG. 4 are one source of the tests that will be carried out in the steps of FIG. 5; however, they can be received from other sources as well.

Figure 5:
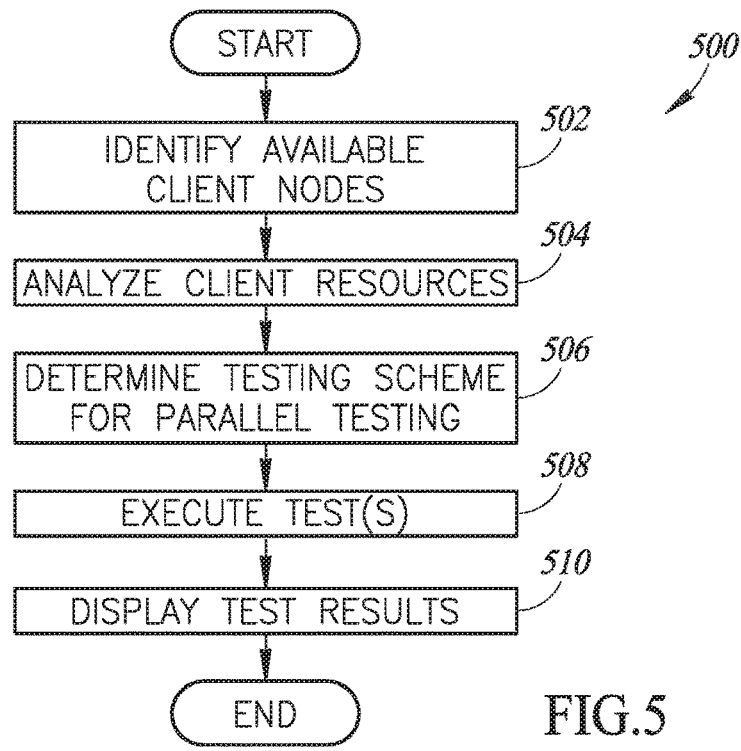
FIG. 5 is a process flow diagram showing a sequence of steps in a computer-implemented method of testing a plurality of content receivers, according to one embodiment described herein.

FIG. 5 shows a flow chart for a computer-implemented test method 500, according to one embodiment. The test method 500 tests a plurality of content receivers at the same time by executing a test matrix such as the exemplary test matrix 302 shown in FIG. 3 and that was created as shown in FIG. 4. The computer-implemented test method 500 is codified in the customized application program 256, and is executed by the testing system 250.

At 502, a client hardware configuration is identified.

At 504, client resources are analyzed to determine a particular node setup that should be used. For example, if the number of content receivers to be tested is three, the test case may be referred to as a three-node setup, or a 3-STB test case. Because the number of nodes is variable, the test system is a scalable system.

At 506, a testing scheme is determined for carrying out parallel testing of multiple nodes. For example, a first test matrix 302 stored in memory that was initially created for a 2-node setup can be adapted to accommodate a 4-node setup and can then be used to test all four of the nodes at once. Furthermore, a second test matrix 302 designed for a 2-node setup can be designated to test two of the four nodes.

At 508, the test matrix 302 is executed in response to a user command entered at the user station 258. The tests are executed by the processor-based testing modules 252 which, in turn, employ the control devices 208 to change the state of the STBs and/or the satellite antenna(s) 210 in accordance with the sequence of commands in the test script 305. In the embodiment shown in FIG. 3, the test script 305 is executed in row-order, starting at the top of the matrix, and progressing downward to the bottom of the matrix.

At 510, test results are displayed at the user station 258 for evaluation by the technician. If additional node setups are to be tested using available tests, the method 500 can be repeated.

One skilled in the art will recognize that the present disclosure can also apply to other types of systems that offer automated testing capabilities. Such systems can include computer systems, networking systems, telephone systems, industrial equipment systems, medical equipment systems, and the like. While the disclosure shows and describes media-related embodiments, it will be understood by those skilled in the art that various other changes in the form and details may be made therein without departing from the spirit and scope of the invention.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

It will be appreciated that, although specific embodiments of the present disclosure are described herein for purposes of illustration, various modifications may be made without departing from the spirit and scope of the present disclosure. Accordingly, the present disclosure is not limited except as by the appended claims.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer-implemented method comprising:
receiving input from a user specifying a number of multimedia content receivers to be tested;
creating a test matrix having a first matrix dimension based on the number of multimedia content receivers, the test matrix being executable by a processor-based testing module;
providing to the user a user interface that includes a first visual component, the first visual component including test building blocks that each correspond to an option of operations to be performed during testing of the number of multimedia content receivers;
receiving user selections of one or more of the test building blocks from the first visual component via the user interface to construct, in a second visual component of the user interface, a plurality of test command sequences each simulating interaction with an individual multimedia content receiver of the number of the multimedia content receivers via a remote control; and
storing each of the plurality of test command sequences as a separate sequence arranged along the first matrix dimension of the test matrix.

2. The method of claim 1, wherein the test building blocks include one or more of remote control key entries, push button sequences, screen shots, conditional blocks, input blocks, output blocks, loops, and satellite feed switches.

3. The method of claim 2, wherein the satellite feed switches couple to a selected multimedia content receiver one or more of: a live satellite feed, no satellite feed, a plurality of satellite feeds, a multiplexed satellite stream simulating custom content, and a satellite orientation setting.

4. The method of claim 1, comprising:
receiving a first plurality of user inputs via interaction with the user interface in connection with a first identifier of a first multimedia content receiver of the number of multimedia content receivers; and
receiving a second plurality of user inputs via interaction with the user interface in connection with a second identifier of a second multimedia receiver of the number of multimedia content receivers.

5. The method of claim 4, wherein the test matrix is created based on the first plurality of user inputs and the second plurality of user inputs, the method comprising:
providing the test matrix to a first testing module associated with the first identifier and to a second testing module associated with the second identifier.

6. The method of claim 1, wherein each test command sequence of the plurality of sequences is associated with a subset of the number of multimedia content receivers to be tested using the test command sequence.

7. The method of claim 1, wherein the test matrix is a data structure in which the plurality of test command sequences are arranged along the first matrix dimension and operations of each test command sequence of the plurality of sequences are arranged along a second matrix dimension of the test matrix.

8. The method of claim 1, wherein the processor-based testing module operates as a server module in a server/client relationship in which the server module controls one or more client modules.

9. The method of claim 8, comprising:
identifying, by the server module, client modules that are available for testing;
analyzing, by the server module, the available client modules to determine a testing scheme for executing tests in parallel on a plurality of the client modules available;
executing the test matrix in response to a user command; and
displaying test results when the executing is complete.

10. The method of claim 1, wherein the multimedia content receivers are television content receivers.

11. One or more non-transitory computer-readable media storing instructions that, as a result of execution by one or more processors, cause the one or more processors to:
cause presentation of a user interface that includes a test building block menu, the test building block menu including options of commands for testing one or more content receivers;
generate a data structure for testing a plurality of content receivers based, at least in part, on a test matrix component displayed via the user interface, the data structure including:
a plurality of command rows, each command row bearing commands that simulate interaction with an individual content receiver of the plurality of content receivers via a remote control, the commands selected from the test building block menu; and
a plurality of columns, each column associated with one content receiver of the plurality of content receivers controllable via the remote control; and provide the data structure to a plurality of processor-based testing modules that control the plurality of content receivers.

12. The one or more non-transitory computer-readable media of claim 11, wherein the commands in the data structure include one or more of actions, functions, delays, switches, screen shots, loops, input blocks, output blocks, and conditional blocks.

13. The one or more non-transitory computer-readable media of claim 11, wherein execution of the instructions causes the one or more processors to:
   display a graphical user interface that includes the test building block menu and a representation of the data structure generated.

14. The one or more non-transitory computer-readable media of claim 13, wherein execution of the instructions causes the one or more processors to:
   receive a plurality of user selections via the graphical user interface specifying commands for simulating user interaction via a remote control, wherein the data structure is generated based on the plurality of user selections.

15. The one or more non-transitory computer-readable media of claim 13, wherein implementation of the data structure causes each of a plurality of control devices to issue a sequence of commands for testing a corresponding content receiver of the plurality of content receivers.

16. A system, comprising:
   one or more processors; and
   memory storing contents that, when executed by the one or more processors, cause the system to perform actions comprising:
      causing presentation of a user interface that includes a first visual component, the first visual component including test building blocks that each correspond to an option of operations to be performed during testing of one or more content receivers;
      receiving user selections of one or more of the test building blocks from the first visual component via the user interface to construct, in a second visual component of the user interface, a plurality of test command sequences simulating interaction with a plurality of content receivers; and
      storing each of the plurality of test command sequences as a separate sequence arranged along a first matrix dimension of a test matrix.

17. The system of claim 16, wherein each test command sequence of the plurality of sequences is associated with a subset of the plurality of content receivers to be tested using the test command sequence.

18. The system of claim 16, wherein the test matrix is a data structure in which the plurality of test command sequences are arranged along the first matrix dimension and operations of each test command sequence of the plurality of sequences are arranged along a second matrix dimension of the test matrix.

19. The system of claim 16, wherein the actions further comprise determining a testing scheme for executing tests in parallel on two or more content receivers of the plurality of the content receivers.

20. The system of claim 16, wherein the actions further comprise causing execution of one or more of the test command sequences in response to a user command to execute the test matrix.

* * * * *